United States Patent
Nagahori et al.

(10) Patent No.: US 7,890,713 B2
(45) Date of Patent: Feb. 15, 2011

(54) STORAGE AND DATA PROTECTION ARRANGEMENTS MANAGING AND SETTING AN ACCESS ATTRIBUTE ON A STORAGE AREA BASIS

(75) Inventors: Ryuji Nagahori, Hiratsuka (JP); Yosuke Nishi, Kawasaki (JP); Eiichi Sato, Hiratsuka (JP); Kenichi Takamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1061 days.

(21) Appl. No.: 11/585,223

(22) Filed: Oct. 24, 2006

(65) Prior Publication Data

US 2008/0022062 A1    Jan. 24, 2008

(30) Foreign Application Priority Data

Jul. 24, 2006  (JP) .............................. 2006-200806

(51) Int. Cl.
- G06F 12/00 (2006.01)
- G06F 13/00 (2006.01)
- G06F 13/28 (2006.01)

(52) U.S. Cl. .................................................... 711/162

(58) Field of Classification Search ...................... None
See application file for complete search history.

(56) References Cited

U.S. PATENT DOCUMENTS

| 6,836,819 B2 | 12/2004 | Kano et al. |
| 2004/0268038 A1 | 12/2004 | Nagasoe et al. |
| 2005/0091455 A1* | 4/2005 | Kano et al. .................. 711/114 |
| 2005/0210028 A1* | 9/2005 | Kodama ......................... 707/9 |
| 2006/0026373 A1* | 2/2006 | Kaneda et al. ............... 711/162 |

FOREIGN PATENT DOCUMENTS

| JP | 2003-015915 | 1/2003 |
| JP | 2005-018568 | 1/2005 |

* cited by examiner

*Primary Examiner*—Kevin L Ellis
*Assistant Examiner*—Chad L Davidson
(74) *Attorney, Agent, or Firm*—Antonelli, Terry, Stout & Kraus, LLP.

(57) ABSTRACT

A storage apparatus and data protection method that can substantially improve the use efficiency of volumes.

A virtual first volume is provided to a host apparatus, and a storage area with a necessary capacity from among one or more storage areas is dynamically allocated to the first volume in response to a write access request from the host apparatus; and write data from the host apparatus is stored in the storage area, and an access attribute representing the possibility or impossibility of access is set for the storage area.

2 Claims, 7 Drawing Sheets

| PRIMARY VOLUME ID | PRIMARY VOLUME ADDRESS | POOL VOLUME ID | POOL VOLUME ADDRESS | NORMALIZATION DESTINATION LOGICAL VOLUME ID | NORMALIZATION DESTINATION LOGICAL ADDRESS |
|---|---|---|---|---|---|
| 01 | 1~1073152 | 00 | 1~1073152 | 0C | 1~1073152 |
| 01 | 1073153~2139804 | 01 | 1073153~2139804 | 0C | 1073153~2139804 |
| 02 | 1~983311 | 02 | 2139805~3123116 | 0E | 1~983311 |
| 03 | 1~204487 | 0A | 3123117~3227604 | 0C | 2139805~2344292 |
| ... | ... | ... | ... | ... | ... |

SHARED MEMORY
- STORAGE AREA MANAGEMENT TABLE — 30
- POOL VOLUME MANAGEMENT TABLE — 31
- STORAGE AREA-NORMALIZATION DESTINATION LOGICAL VOLUME MAPPING TABLE — 32

| POOL VOLUME ID | NORMALIZATION DESTINATION LOGICAL VOLUME ID |
|---|---|
| 02 | 00 |
| 03 | 01 |
| A | 00 |
| ⋮ | ⋮ |

| POOL VOLUME ID | ACCESS ATTRIBUTE FLAG | PRIMARY VOLUME-POOL VOLUME MAPPING FLAG | PASSED TIME PERIOD (DAYS) | NORMALIZATION THRESHOLD VALUE (DAYS) | CAPACITY (block) |
|---|---|---|---|---|---|
| 00 | 0 | 0 | 20 | 50 | 1073152 |
| 01 | 0 | 0 | 40 | 50 | 1073192 |
| 02 | 1 | 1 | 10 | 30 | 4096 |
| ... | ... | ... | ... | ... | ... |
| 31A | 31B | 31C | 31D | 31E | 31F |

STORAGE AND DATA PROTECTION ARRANGEMENTS MANAGING AND SETTING AN ACCESS ATTRIBUTE ON A STORAGE AREA BASIS

CROSS-REFERENCES TO RELATED APPLICATIONS

This application relates to and claims priority from Japanese Patent Application No. 2006-200806, filed on Jul. 24, 2006, the entire disclosure of which is incorporated herein by reference.

BACKGROUND

1. Field of the Invention

The invention relates to a storage apparatus and a data protection method, for example, one that is suited for use in a storage apparatus having the AOU (Allocation on Use) function.

2. Description of Related Art

Some data stored in storage apparatuses is required by laws or company rules to be kept for a certain period of time. Depending the type of data, it is sometimes required to keep data for several years or decades (or more as the case may be).

In light of the above circumstances, in recent years, in JP-A-2005-18568, the applicant of the present application proposed a method for setting an access attribute for each volume (read access permission/prohibition, write access permission/prohibition, etc.) in order to prevent unauthorized access to volumes in a storage apparatus from a host apparatus, which is a higher-level system.

Meanwhile, when a user wishes to extend the capacity of a logical volume, he/she needs to contact the logical volume provider. However, if multiple users simultaneously make logical volume extension requests to a large-scale site like a data center, which multiple companies jointly use, the logical volume provider cannot fully respond to those requests, and in the worst-case scenario, the processing in the logical volume provider's host apparatus may halt.

In light of that, in JP-A-2003-15915, the applicant of the present application also proposed a method for dynamically allocating a storage area with an appropriate capacity from among collectively managed storage areas to a logical volume as a method for easily extending a logical volume capacity.

SUMMARY

However, in the access attribute setting function disclosed in JP-A-2005-18568, the access attribute is set for the entire volume. Therefore, with the above conventional access attribute setting function, if the access attribute to prohibit write access is set for a volume, even write access to unused areas in that volume will also be prohibited, lowering the use efficiency in the volume.

The present invention has been made in light of the above points, and has the objective of providing a storage apparatus and a data protection method that can improve the use efficiency of volumes.

In order to achieve that objective, the present invention provides a storage apparatus including: a storage area allocation unit that provides a virtual first volume to a host apparatus, and dynamically allocates a storage area with a necessary capacity from among one or more storage areas to the first volume in response to a write access request from the host apparatus; a data storing unit that stores write data provided from the host apparatus in the storage area; and an access attribute setting unit that sets an access attribute representing possibility or impossibility of access for the storage area.

Accordingly, the storage apparatus makes it possible to set an access attribute for each storage area allocated to the first volume.

The present invention also provides a data protection method including: a first step of providing a virtual first volume to a host apparatus, and dynamically allocating a storage area with a necessary capacity from among one or more storage areas to the first volume in response to a write access request provided from the host apparatus; and a second step of storing write data provided from the host apparatus in the storage area, and setting an access attribute representing possibility or impossibility of access for the storage area.

Accordingly, this data protection method makes it possible to set an access attribute for each storage area allocated to the first volume.

Since the present invention makes it possible to set an access attribute for a storage area, which is an area with a capacity smaller than the first volume provided to a host apparatus, access to unused areas in the first volume will not be limited, and thus, the use efficiency of the first volume can be improved.

Other aspects and advantages of the invention will be apparent from the following description and the appended claims.

DETAILED DESCRIPTION OF PREFERRED EMBODIMENTS

An embodiment of the present invention will be explained in detail with reference to the drawings.

(1) Configuration of a Storage System According to the Embodiment

Figure 1:
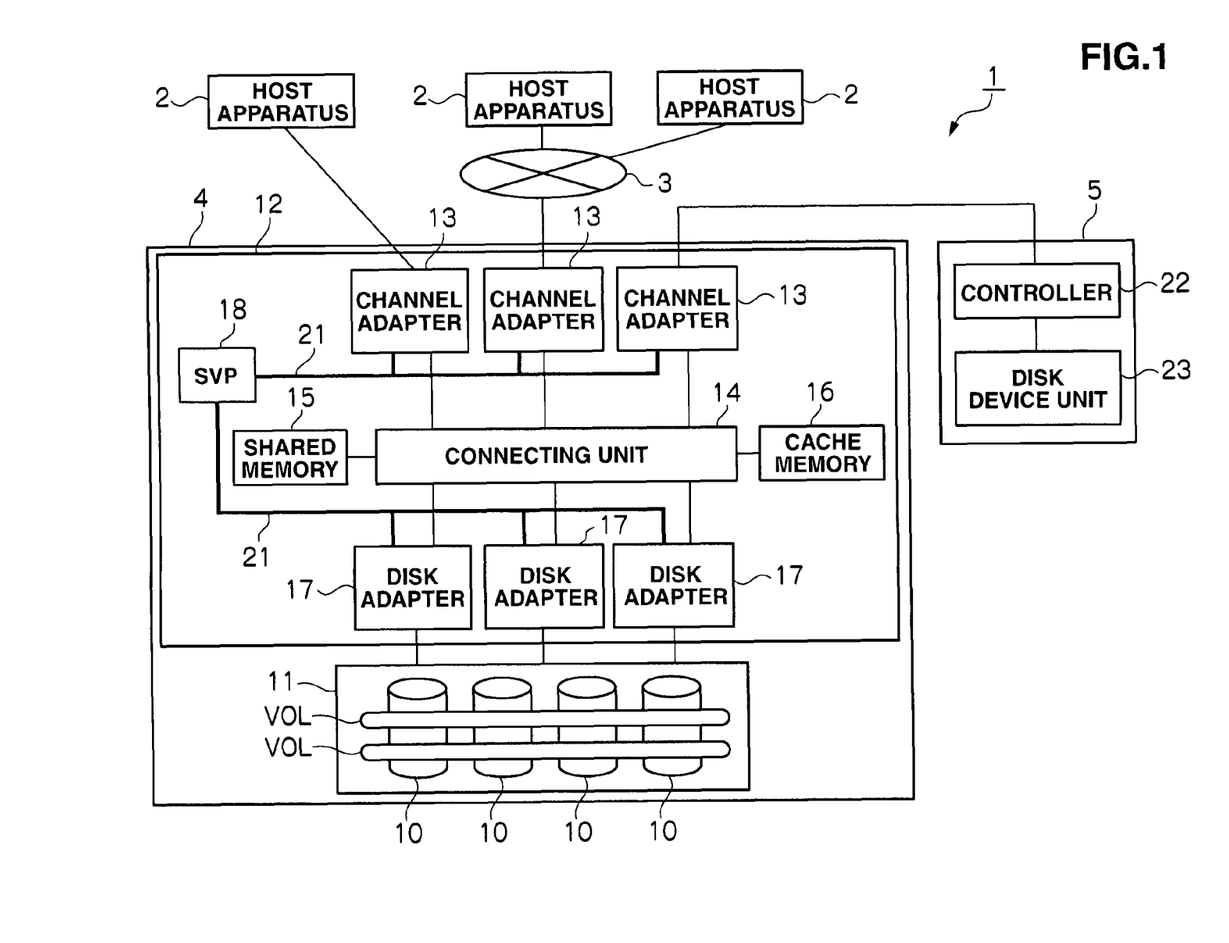
FIG. 1 is a block diagram showing the entire configuration of a storage apparatus according to an embodiment of the present invention.

In FIG. 1, 1 denotes the entire storage system according to this embodiment. In the storage system 1, host apparatuses 2 are connected directly or indirectly via a network 3 to a first storage apparatus 4, and the first storage apparatus 4 is connected to a second storage apparatus 5.

The host apparatuses 2 are computer apparatuses, each including information processing resources such as a CPU (Central Processing Unit) or memory, etc., and may be personal computers, work stations, or mainframes, etc. Each host apparatus 2 also includes information input devices (not shown) such as a keyboard, a switch, a pointing device, or a microphone, and information output devices (not shown) such as a monitor display or a speaker.

The network 3 may be a SAN (Storage Area Network), a LAN (Local Area Network), the Internet, a public line or a dedicated line. Communication between the host apparatuses 2 and the first storage apparatus 4 via the network 3 is performed according to Fibre Channel Protocol if the network 3 is a SAN, and according to TCP/IP (Transmission Control Protocol/Internet Protocol) if the network 3 is a LAN.

The first storage apparatus 4 includes a disk device unit 11 consisting of multiple disk devices 10 providing storage areas for storing data, and a controller 12 that controls the disk devices 10 in the disk device unit 11.

The disk devices 10 may be expensive disks such as SCSI (Small Computer System Interface) disks, or inexpensive disks such as SATA (Serial AT Attachment) or optical disks. These disk devices 10 are managed by the controller 12 according to RAID (Redundant Arrays of Inexpensive Disks) methodology. The disk devices 10 may be substituted with semiconductor memory such as flash memory.

One or more logical volumes VOL are defined over physical storage areas provided by one or more of the disk devices 10. Data from the host apparatuses 2 is written to these logical volumes VOL and data is read from the logical volumes VOL to the host apparatuses 2, in block units of a predetermined size.

Each logical volume VOL is assigned with a unique identifier (LUN: Logical Unit Number). In this embodiment, data is output/input designating an address, which is the combination of a LUN, and a unique number assigned to each block (LBA: Logical Block Address).

Examples of attributes for a logical volume VOL created in the first storage apparatus 4 include a physical volume and a virtual volume. The physical volume is a tangible volume where data is actually written/read. The later-described pool volume PLVOL (FIG. 3) is also an example of the physical volume. A virtual volume is an intangible volume created virtually. The virtual volume is associated with a physical volume, and write/read access to the virtual volume is performed on the physical volume associated with the virtual volume.

The controller 12 includes a plurality of channel adapters 13, a connecter 14, shared memory 15, cache memory 16, a plurality of disk adapters 17 and a service processor 18.

Each channel adapter 13 is constructed as a microcomputer system including a microprocessor, memory and a communication interface, etc., and also includes a port for connecting with the network 3. The channel adapters 13 interpret various commands sent from the host apparatuses 2, and execute the relevant processing. The port for each channel adapter 13 is assigned a network address for identifying each channel adapter 13 (for example, an IP address or a WWN), making it possible for each channel adapter 13 to individually behave as a NAS (Network Attached Storage) device.

The connecting unit 14 is connected to the channel adapters 13, the shared memory 15, the cache memory 16, and the disk adapter 17. The transmission of data or commands between the channel adapters 13, the shared memory 15, the cache memory 16, and the disk adapters 17 is conducted via the connecting unit 14. The connecting unit 14 may be a switch, such as a high-speed cross-bus switch that transmits data by high-speed switching, or a bus.

The shared memory 15 is memory shared by the channel adapters 13 and the disk adapters 17. The shared memory 15 is mainly used for storing system configuration information.

The cache memory 16 is also memory shared by the channel adapters 13 and the disk adapters 17. The cache memory 16 is mainly used for temporarily storing data input/output to/from the storage apparatus 4.

Figure 2:
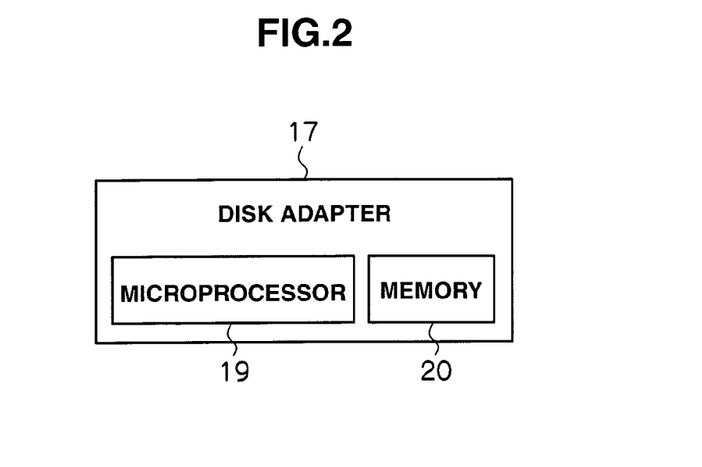
FIG. 2 is a block diagram showing the schematic configuration of a disk adapter.

Each disk adapter 17, as shown in FIG. 2, is constructed as a microcomputer system including a microprocessor 19 and memory 20, etc. The memory 20 stores various control programs containing the later-described data protection function-related control programs. The microprocessor 19 executing these control programs makes the disk adapter 17 execute various control processing, including the later-described data protection function-related control processing. The disk adapters 17 are connected to their corresponding disk devices 10 via, for example, a Fibre Channel cable, and send/receive data to/from those disk devices 10 according to Fibre Channel Protocol.

The service processor 18 is a computer device that controls the overall operation of the first storage apparatus 4, and may be a laptop personal computer. The service processor 18 is connected to the channel adapters 13 and the disk adapters 17 via a LAN 21, and performs various control processing and collects various information via the channel adapters 13 and the disk adapters 17.

The second storage apparatus 5 includes a controller 22 and a disk device unit 23 having the same configuration as the controller 12 and the disk device unit 11 in the first storage apparatus 4, and is connected to the external connection channel adapter 13 in the first storage apparatus 4 via a network or cable or the like. The storage areas provided by the disk device unit 23 in the second storage apparatus 5 are virtualized and provided to the host apparatuses 2 by the fist storage apparatus 4's controller 12.

(2) Data Protection Method in the Storage System (2-1) AOU Function in the Storage System Next, the AOU function adopted in the storage system 1 will be explained. Here, the "AOU function" means a function that dynamically allocates a storage area with the necessary capacity to a host apparatus 2 in response to a write access request from the host apparatus 2.

Figure 3:
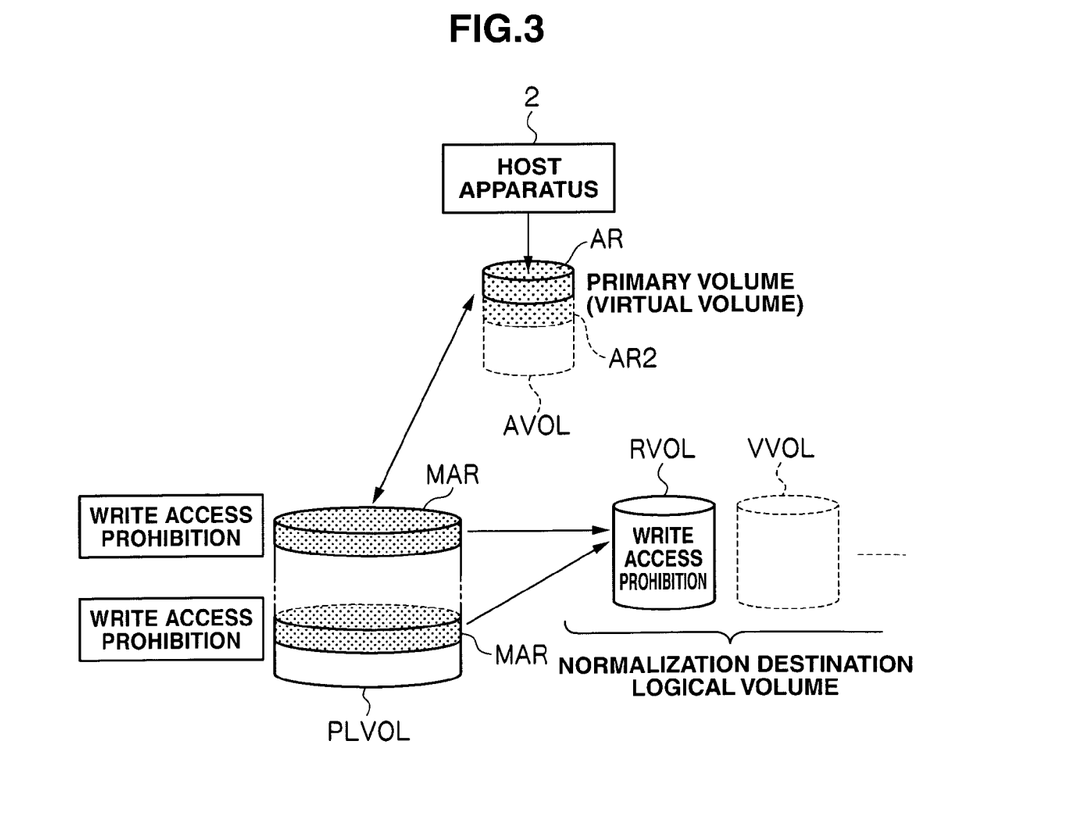
FIG. 3 is a conceptual diagram for briefly explaining a data protection function in the storage system according to the embodiment.

In this storage system 1, the disk adapters 17 in the first storage apparatus 4, as shown in FIG. 3, manage the storage areas provided by the disk devices 10 in the first storage apparatus 4, and part of the storage areas provided by the disk devices in the second storage apparatus 5, as one pool volume PLVOL. Also, the disk adapters 17 provide the host apparatuses 2 with virtual volumes as volumes PVOL for the host apparatuses 2 to write/read data to/from (hereinafter, referred to as primary volume).

A disk adapter 17, upon receipt of a write access request from a host system 2 targeting a primary volume PVOL, allocates a storage area MAR with the capacity necessary for the write access in the pool volume PLVOL to the primary volume PVOL, and stores the write data in this storage area MAR.

Figure 4:
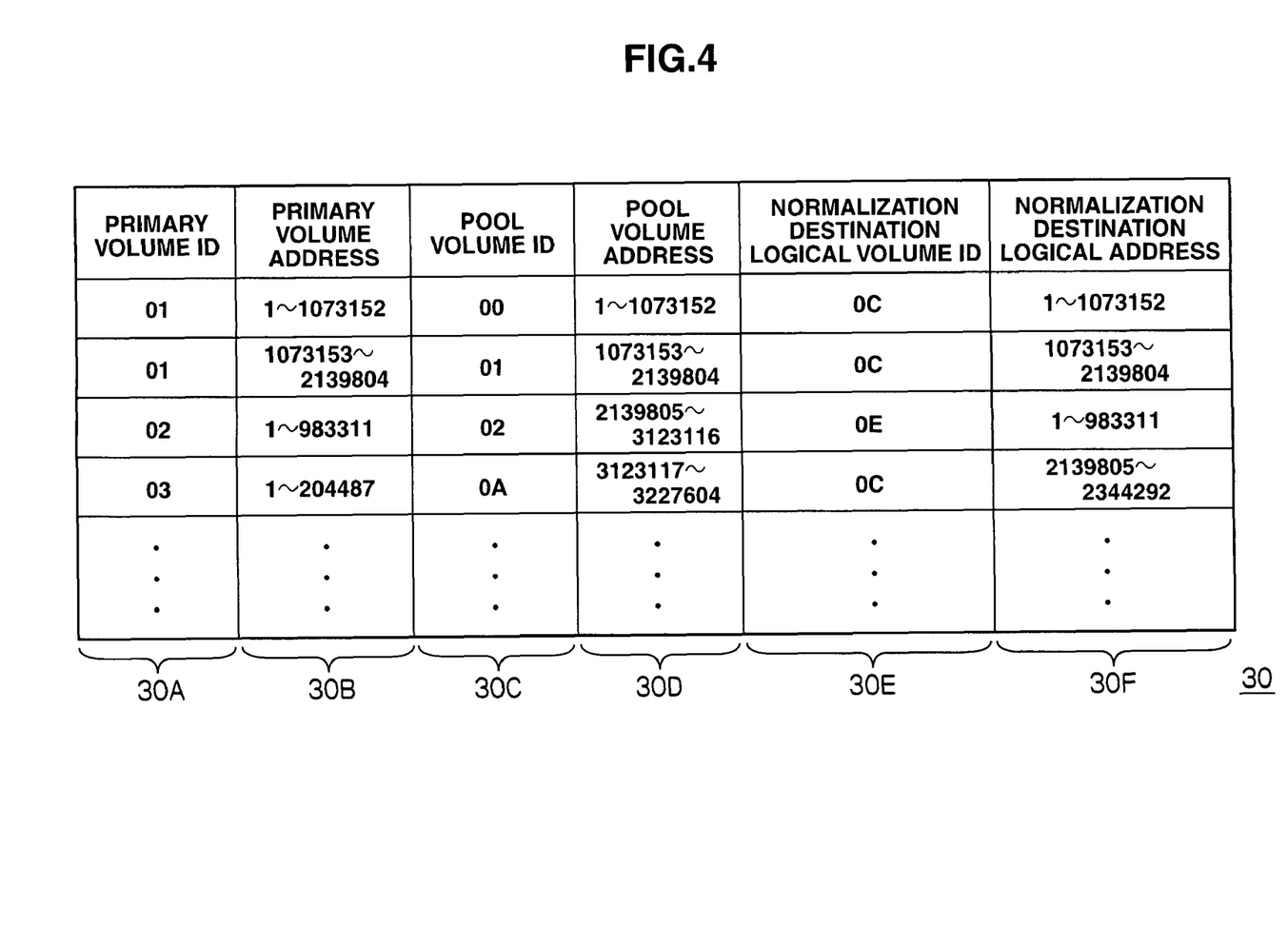
FIG. 4 is a conceptual diagram showing the structure of a storage area management table.

At this time, the disk adapter 17 separates the storage area MAR from the pool volume PLVOL and provides the storage area MAR with a unique identifier (hereinafter, referred to as a "pool volume ID"), and manages the correspondence between the storage area MAR in the pool volume PLVOL allocated to the primary volume PVOL and the area AR in the primary volume PVOL where this storage area MAR has been allocated, in a storage area management table 30, shown in FIG. 4, kept in the memory 20 (FIG. 4).

Here, the storage area management table 30, as is clear from FIG. 4, consists of a "primary volume ID" column 30A, a "primary volume address" column 30B, a "pool volume ID"

column 30C, a "pool volume address" 30D, a "normalization destination logical volume ID" 30E, and a "normalization destination logical volume address" 30F.

The "primary volume ID" column 30A stores volume IDs (e.g., LUNs) for the primary volumes PVOL where storage areas MAR in a pool volume PLVOL have been allocated. The "primary volume address" column 30B stores block addresses for the areas AR (LBAs for the first block and the last block in each of the areas AR) in the primary volumes PVOL where the corresponding storage areas MAR have been allocated. The "pool volume address" column 30D stores block addresses for the storage areas MAR (LBAs for the first block and the last block of each of the storage areas MAR) allocated to the corresponding primary volumes PVOL. The "pool volume ID" column 30C stores pool volume IDs provided to the corresponding storage areas MAR. The "normalization destination logical volume ID" column 30E and the "normalization destination logical volume address" column 30F will be explained later.

Accordingly, the FIG. 4 example indicates that the storage area with block address "1 to 1073152" in a pool volume PLVOL is allocated to the area with block address "1 to 1073152" in the primary volume with volume ID "01" and that that storage area has been provided with the pool volume ID "00."

A disk adapter 17, upon the allocation of a storage area MAR in a pool volume PLVOL to any primary volume PVOL, stores relevant information in the "primary volume ID" column 30A, the "primary volume address" column 30B, the "pool volume ID" column 30C, and the "pool volume address" column 30D of the storage area management table 30.

Subsequently, upon receipt of a read access request designating an address in a primary volume from a host apparatus 2, the disk adapter 17, referring to the storage area management table 30, reads data from the relevant address position in the relevant storage area MAR in the pool volume PLVOL, and sends the data to the host apparatus 2.

Also, upon receipt of a write address request targeting an area AR2 in a primary volume PVOL where a storage area MAR in a pool volume PLVOL has not been allocated, the disk adapter 17 dynamically allocates another storage area MAR to the primary volume PVOL in the same manner as above.

As explained above, the storage system 1 dynamically allocates a storage area MAR in the pool volume PLVOL to the primary volume PVOL for every write access request from a host apparatus 2 targeting an unused area in the primary volume PVOL.

(2-2) Data Protection Function in the Storage System

Next, the data protection function adopted in the storage system 1 will be explained.

As shown in FIG. 3, one of the characteristics of the storage system 1 is that an access attribute can be set for each of the storage areas MAR in the pool volume PLVOL allocated to the primary volumes PVOL. Another characteristic of the storage system 1 is that write data stored in multiple storage areas MAR, for which the same access attribute is set, from among the storage areas MAR in a pool volume PLVOL allocated to a primary volume PVOL is collectively migrated to the same logical volume (hereinafter referred to as a "normalization destination logical volume") VOL, and the relevant access attribute can be set for the entire normalization destination logical volume VOL.

Examples of the normalization destination logical volume VOL include physical volumes RVOL provided in the first storage apparatus 4, and virtual volumes VVOL associated with the physical volumes in the second storage apparatus 5.

Also, hereinafter, the migration of data stored in the storage areas MAR in the pool volume allocated to the primary volumes PVOL to the normalization destination logical volumes VOL is referred to as "normalization."

Figure 5:
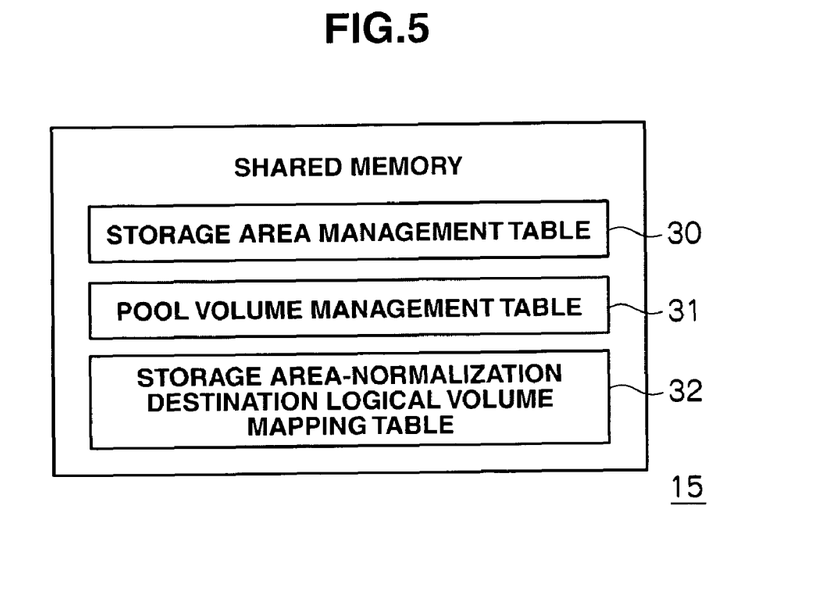
FIG. 5 is a conceptual diagram for explaining various tables stored in shared memory.

As the means for executing the above data protection function, the shared memory 15 (FIG. 1) in the first storage apparatus 1 stores a pool volume management table 31, and a storage area—normalization destination logical volume mapping table 32, in addition to the above storage area management table 30 as shown in FIG. 5.

Figure 6:
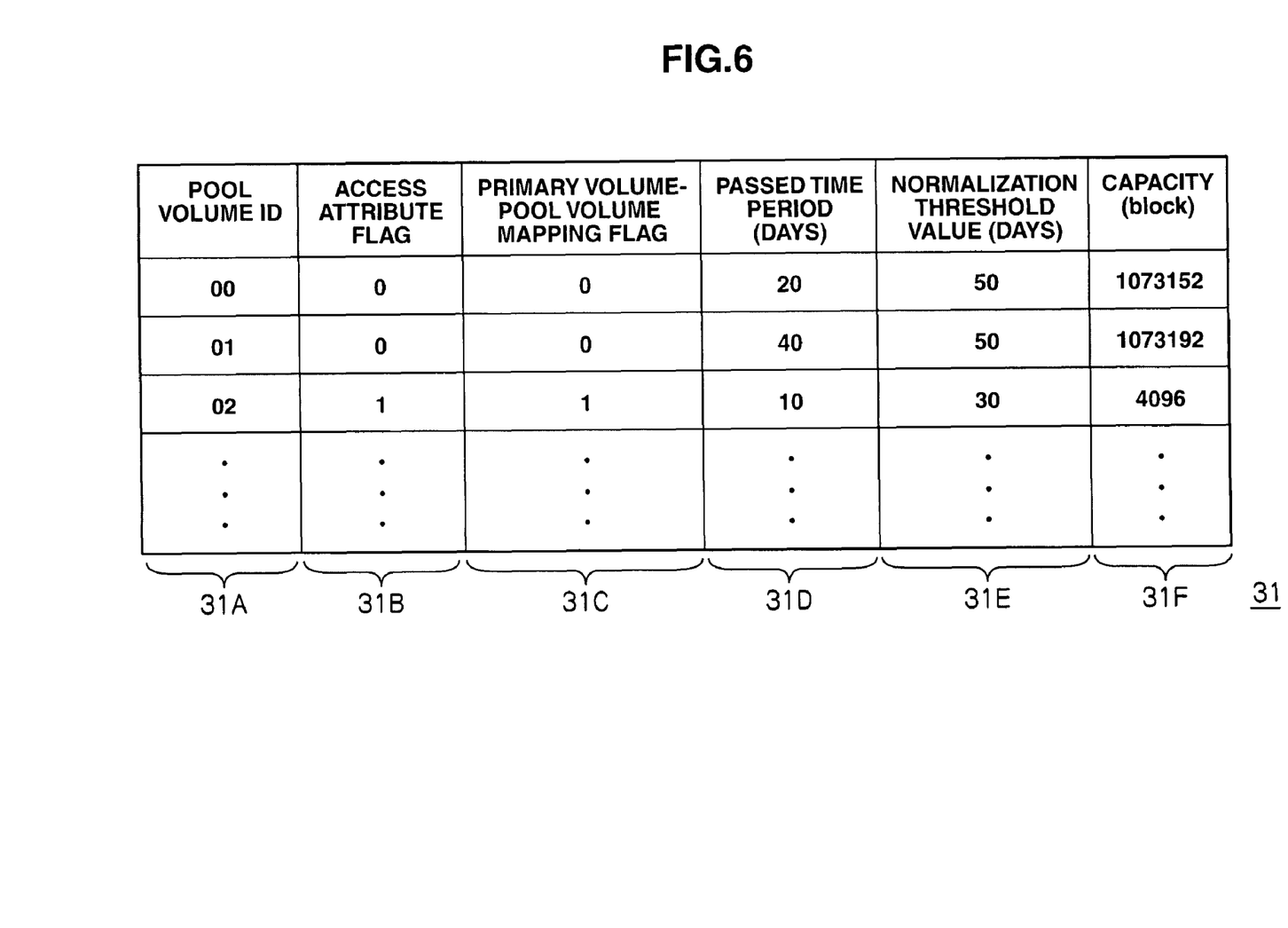
FIG. 6 is a conceptual diagram showing the structure of a pool volume management able.

The pool volume management table 31 is a table for managing the storage areas MAR in a pool volume PLVOL provided with pool volume IDs, and as shown in FIG. 6, consists of a "pool volume ID" column 31A, an "access attribute flag" column 31B, a "logical volume mapping flag" column 31C, a "passed time period" column 31D, a "normalization threshold value" column 31E, and a "capacity" column 31F.

The "pool volume ID" column 31A stores pool volume IDs provided to the corresponding storage areas MAR separated from the pool volume PLVOL. The "access attribute flag" column 31B stores "1" (flag) if write access prohibition is set for a storage area MAR, and "0" if write access prohibition is not set for a storage area MAR.

The "logical volume mapping flag" column 31C stores "1" (flag) if a normalization destination logical volume VOL, which is the normalization destination (migration destination) for write data stored in the corresponding storage area MAR, has already been mapped, and "0" is stored if the normalization destination logical volume VOL has been mapped to the corresponding storage area MAR.

The "passed time period" column 31D stores the time periods (the number of days passed) since the corresponding storage areas MAR were allocated to the primary volumes PVOL. The "normalization threshold value" column 31E stores criteria for normalizing write data stored in the corresponding storage areas MAR, i.e., migrating the write data to the normalization destination logical volumes VOL (hereinafter referred to as the "data migration criterion"). In this embodiment, the number of days from the allocation of a storage area MAR to a primary volume PVOL until the normalization of the data (hereinafter referred to as the "normalization threshold period") is adopted for the data migration criterion, and the corresponding normalization threshold periods are stored in the "normalization threshold value" column 31E. The "capacity" column 31F stores the storage capacities (the number of blocks) of the corresponding storage areas MAR.

A disk adapter 17, upon allocation of a storage area MAR in a pool volume PVOL to a primary volume PVOL, stores the pool volume ID assigned to the storage area MAR in the "pool volume ID" column 31A of the pool volume management table 31, and also stores the capacity of the storage area MAR (the number of blocks) in the "capacity" column 31F.

Accordingly, the FIG. 6 example indicates that: the storage area MAR assigned pool volume ID "00" has a storage capacity equivalent to "1073152" blocks; write access permission is set for that storage area MAR as an access attribute; and no normalization destination logical volume VOL has been mapped yet. Also it indicates that data stored in this storage area MAR is set to be normalized after "50 days" have passed from the allocation of the storage area MAR to the primary volume PVOL, and that only "20 days" have passed from the allocation to the primary volume PVOL.

Figure 7:
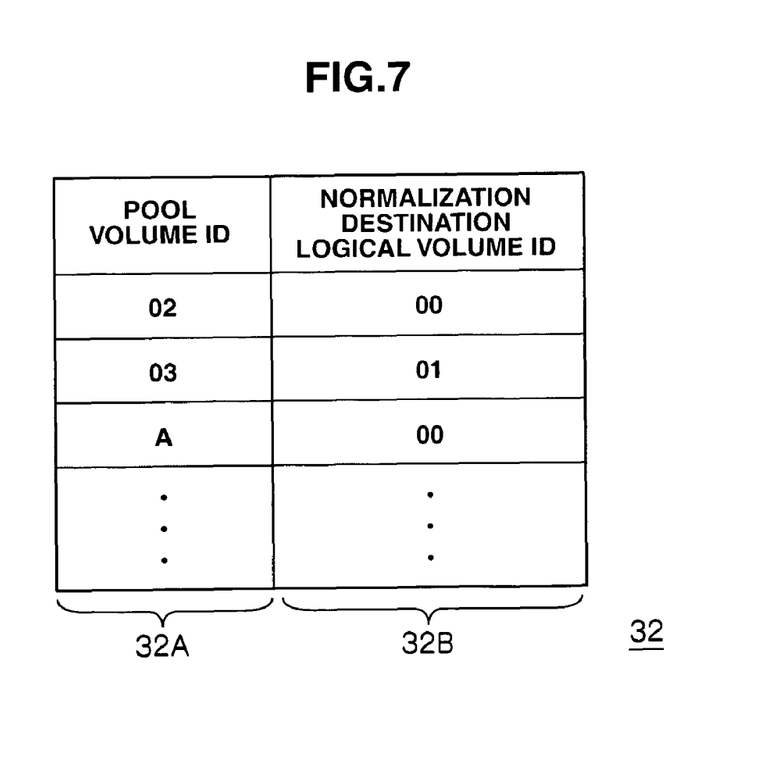
FIG. 7 is a conceptual diagram showing the structure of a storage area—normalization destination logical volume mapping table.

The storage area—normalization destination logical volume mapping table 32 is a table for managing the correspondence between storage areas MAR assigned with pool volume IDs separated from the pool volume PLVOL, and the normalization destination logical volumes VOL, which are the normalization destinations (migration destinations) for data stored in the corresponding storage areas MAR, and as shown in FIG. 7, consists of a "pool volume ID" column 32A, and a "normalization destination logical volume ID" column 32B.

The "pool volume ID" column 32A stores pool volume IDs assigned to the corresponding storage areas MAR separated from the pool volume PLVOL, and the "normalization destination logical volume ID" column 32B stores volume IDs for normalization destination logical volumes VOL set as the normalization destinations for data stored in the corresponding storage areas MAR.

Accordingly, the FIG. 7 example shows that the normalization destination logical volume VOL with volume ID "00" has been mapped to the storage area MAR with pool volume ID "02", and this normalization destination logical volume VOL has been mapped also to the storage area with pool volume ID "0A". In that case, all the data stored in the two storage areas MAR will be migrated to the normalization destination logical volume VOL.

Figure 8:
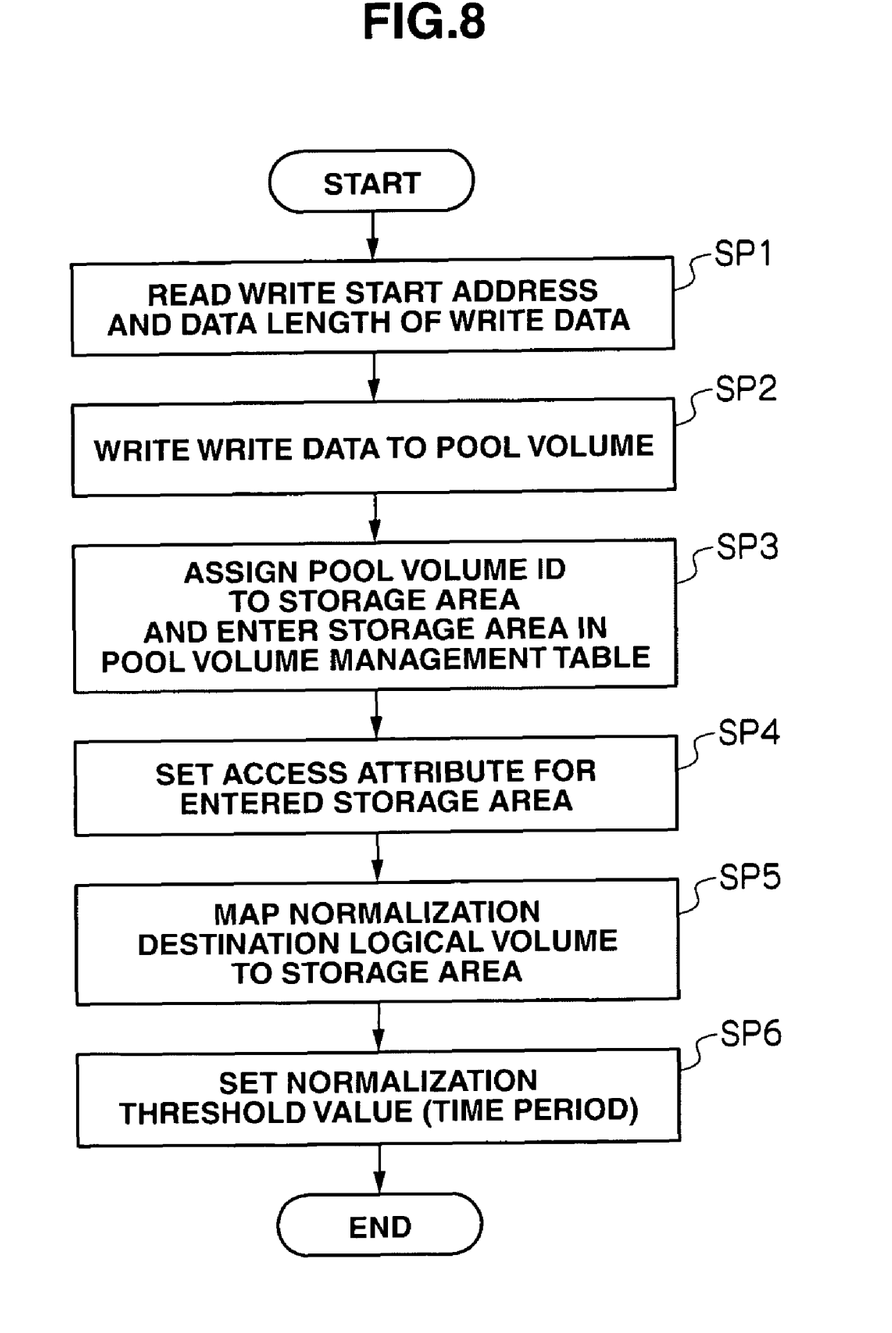
FIG. 8 is a flowchart showing the flow of first data protection processing.
Figure 9:
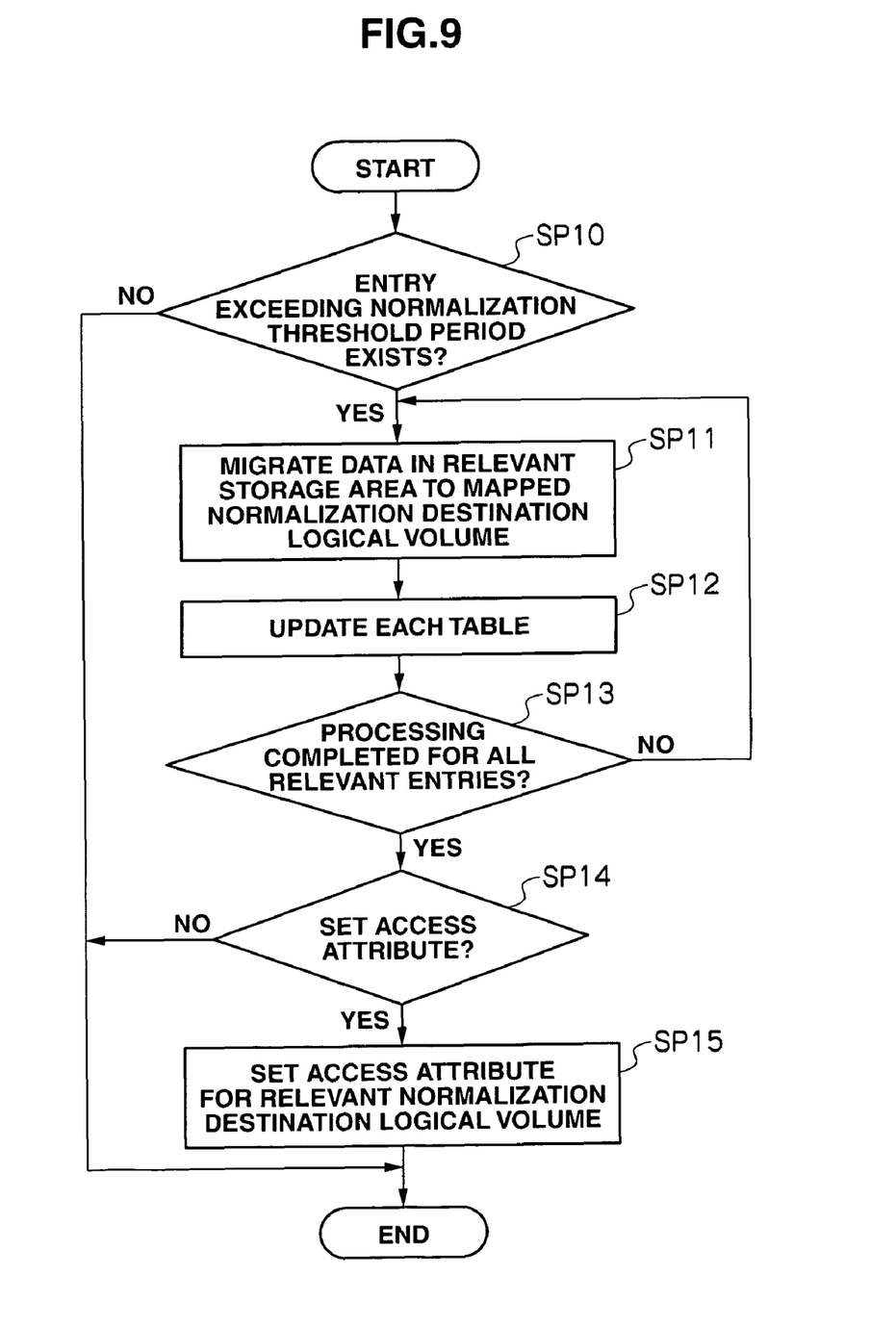
FIG. 9 is a flowchart showing the flow of second data protection processing.

Each of FIGS. 8 and 9 is a flowchart showing the content of processing performed by each disk adapter 17 in the first storage apparatus 4 in relation to the aforementioned data protection function according to this embodiment.

A write access request and write data (data to be written) from a host apparatus 2 is stored in the cache memory 16 (FIG. 1) via a channel adapter 13. A disk adapter 17, based on a notice from the channel adapter 13, reads the write access request stored in the cache memory 16, and then starts the first data protection processing shown in FIG. 8. First, it reads the block address with which the write data writing is to be started (hereinafter, referred to as a "write start address") and the data length (SP1).

Subsequently, the disk adapter 17, based on information read from the write access request as described above, reserves a storage area MAR with the necessary capacity in a pool volume VOL, and sends a write command and write data to the disk devices 10 providing that storage area MAR to have the write data stored in the pool volume PLVOL (SP2).

The disk adapter 17 then assigns a pool volume ID to the storage area MAR in the pool volume PLVOL where the write data has been written, and stores the pool volume ID in the "pool volume ID" column 31A, and the number of blocks for that storage area MAR in the "capacity" column 31F, in the pool volume management table 31 (FIG. 6) (SP3).

Next, the disk adapter 17 sets an access attribute for the storage area MAR (SP4). In this embodiment, an access attribute is set in advance for each host apparatus 2. If a write access request obtained at step SP1 is one sent from a host apparatus 2 for which the write access prohibition attribute is set, the disk adapter 17 sets write access prohibition as an access attribute for that storage area MAR, and if the write access request is one sent from a host apparatus 2 for which the write access permission attribute is set, it sets write access permission as an access attribute for the storage area MAR. Also, if write access prohibition is set as an access attribute for the storage area MAR, write access to the storage area MAR will be prohibited from that time under the control of the disk adapter 17. The above "access attribute" setting may also arbitrarily be set by a system administrator using the service processor 18 (FIG. 1) for every write access request from the host apparatuses 2.

Subsequently, the disk adapter 17 associates a normalization destination logical volume VOL, which is the data migration destination when the data stored in the storage area MAR is normalized, with the storage area MAR for which the access attribute has been set (mapping). At that time, the disk adapter 17 selects the normalization destination logical volume VOL, where the storage area MAR will be mapped, so that the normalization destination logical volume VOL will have the least possible number of unused storage areas (SP5). More specifically, if there is a normalization destination logical volume VOL with substantially the same capacity as the relevant storage area MAR, the disk adapter 17 allocates the normalization destination logical volume VOL to the storage area MAR. Also, if there is a normalization destination logical volume VOL with the same capacity as the total capacity of some storage areas including the relevant storage area, the disk adapter 17 associates the normalization destination logical volume VOL with all these storage areas MAR.

After associating the storage area MAR and the normalization destination logical volume VOL, the disk adapter 17 updates the storage area—normalization destination logical volume mapping table 32 (FIG. 7) and the pool volume management table 31 (FIG. 6) according to that association. More specifically, the disk adapter 17 registers the volume ID for the normalization destination logical volume VOL in the storage area—normalization destination logical volume mapping table 32 in association with the pool volume ID provided to the mapping destination storage area MAR, also changes the relevant volume ID(s) already registered in the "normalization destination logical volume ID" column 32B of the storage area—normalization destination logical volume mapping table 32 as needed. The disk adapter 17 stores a flag ("1") in the field of the "primary volume—pool volume mapping flag" column 31C that is associated with the storage area MAR (SP5).

The disk adapter 17 then stores the normalization threshold period for data stored in the storage area MAR set by a system administrator using the service processor 18 (FIG. 1), and also stores the number of days since the allocation of the storage area MAR to the primary volume PVOL in the "passed time period" column 31D of the pool volume management table 31 (SP6). After that, the number of days passed stored in the "passed time period" column 31D will be updated by the disk adapter 17 at, for example, 0:00 a.m. every day by task processing.

The disk adapter 17 then terminates the first data protection processing.

Throughout the first data protection processing, the disk adapters 17 periodically (e.g., daily or weekly cycle) execute the second data protection processing shown in FIG. 9 to normalize data stored in the storage areas MAR exceeding their normalization threshold value from among the storage areas MAR separated from the pool volume PLVOL.

In other words, upon the start of this second data protection processing, the disk adapter 17, referring to the pool volume management table 31 (FIG. 6), judges whether or not there is any entry satisfying the data migration criterion, i.e., the passed time period exceeds the normalization threshold period (SP10).

The disk adapter 17, upon a negative result in this judgment, terminates the second data protection processing.

Meanwhile, the disk adapter 17, upon an affirmative result in this judgment, reads the volume ID for the normalization destination logical volume associated with the relevant storage area MAR from the logical volume—normalization destination logical volume mapping table 32, and migrates the data stored in that storage area MAR to that normalization destination logical volume VOL (SP11).

Subsequently, the disk adapter 17 stores the volume ID for the data migration destination normalization destination logical volume VOL in the "normalization destination logical volume ID" column 30E of the storage area management table 30 (FIG. 4) in association with the pool volume ID provided to the data migration source storage area MAR, and also stores the block addresses (LBAs for the first block and the last block of the relevant area in the normalization destination logical volume VOL) for the area storing the data migrated to the normalization destination logical volume VOL in the corresponding field in the "normalization destination logical volume address" column 30F of the storage area management table 30. Furthermore, the disk adapter 17 deletes the relevant entries in the pool volume management table 31 and the storage area—normalization destination logical volume mapping table 32 (SP12).

The disk adapter 17 performs the same normalization processing (SP11 to SP13) for all of the storage areas MAR separated from the pool volume PLVOL, and then, referring to the storage area—normalization destination logical volume mapping table 32, judges whether or not an access attribute should be set for the normalization destination logical volume VOL, which is the data migration destination in the normalization processing (SP14).

Here, if data has been migrated to the normalization destination logical volume VOL from one or more storage areas MAR for which write access prohibition is set, an access attribute for write access prohibition will be set for the normalization destination logical volume VOL. However, if the normalization destination logical volume VOL is still associated with any storage area MAR in the storage area—normalization destination logical volume mapping table 32, setting an attribute for write access prohibition to the normalization destination logical volume VOL at that stage will result in a failure because it is necessary to eventually migrate data stored in the storage area MAR to the normalization destination logical volume VOL. Therefore, in that scenario, the disk adapter 17 obtains a negative result in the judgment at step SP14. Then, the disk adapter 17 terminates the second data protection processing.

Meanwhile, when data has been migrated to the normalization destination logical volume VOL from one or more storage areas MAR for which write access prohibition is set, if the normalization destination logical volume VOL is not associated with any storage area MAR, no failure will occur even if an access attribute for write access prohibition is set for the normalization destination logical volume VOL.

Also, when data has been migrated to the normalization destination logical volume VOL from one or more storage areas MAR for which no write access prohibition is set, an access attribute for write access permission will be set for the normalization destination logical volume VOL. In that case, even if the normalization destination logical volume VOL is still associated with any storage area MAR, no failure will occur when an access attribute for write access permission is set for that normalization destination logical volume VOL.

Accordingly, in those cases, the disk adapter 17 obtains an affirmative result in the judgment at SP14. So the disk adapter 17 sets the access attribute for the relevant normalization destination logical volume VOL (SP15). More specifically, it sets the relevant access attribute (write access prohibition or write access permission, etc.) as an access attribute for the normalization destination logical volume in a management table (not shown) for managing the access attributes for normalization destination logical volumes VOL. The disk adapter 17 then terminates the second data protection processing.

Next, the content of processing performed by a disk adapter 17 when it receives an access request (write access request or read access request), from a host apparatus 2, targeting the data stored in a storage area MAR separated from the pool volume PLVOL and normalized will be explained below.

The disk adapter 17 first reads the volume ID and block address for the access target primary volume PVOL from the access request, and, referring to the storage area management table 30 (FIG. 4), detects the volume ID for the data migration destination normalization destination logical volume VOL, and the block address in the normalization destination logical volume VOL where that data is stored.

The disk adapter 17 then reads/writes data from/to the relevant area in the relevant normalization destination logical volume VOL based on the detected ID and address.

(3) Effects of the Embodiment

As described above, in the storage system 1 according to this embodiment, storage areas MAR in the pool volume PLVOL are dynamically allocated to primary volumes PVOL, and an access attribute can be set for each of the storage areas MAR allocated to the primary volumes PVOL, making it possible to set an access attribute for each storage area MAR, which is an area with a capacity smaller than a primary volume PLVOL. Accordingly, access to unused areas in the primary volumes PVOL will not be limited, making it possible to improve the use efficiency of the logical volumes VOL.

Also, in the storage system 1 according to this embodiment, write data stored in several storage areas MAR for which the same access attribute is set are collectively migrated to the same normalization destination logical volume VOL, and that same access attribute is set for the normalization destination logical volume VOL, making it possible to reduce the amount of unused areas in the normalization destination logical volume VOL where access is limited, and therefore, the use efficiency of the logical volumes VOL can be improved.

(4) Other Embodiments

The above-described embodiment relates to the case where the present invention is applied to the storage apparatus 4 having the configuration shown in FIG. 1. However, the present invention is not limited to that case, but can be applied to various types of storage apparatus other than the FIG. 1 storage apparatus.

Also, the above-described embodiment relates to the case where the number of days from the allocation of a storage area MAR to a primary volume PVOL until normalization of write data is used as a data migration criterion for normalizing data stored in the storage area MAR. However, the present invention is not limited to that case, and the capacity of the storage area MAR storing write data, the capacity used of the pool volume PLVOL, or the total capacity of the storage areas for which the same access attribute is set may be set as a data migration criterion, or a specific date (year, month and day) may also be set as a data migration criterion. A data migration criterion satisfying some of the aforementioned categories may be used, and various types of criterion other than the aforementioned ones may also be adopted.

The above-described embodiment relates to the case where a data migration criterion can be set for each of the storage areas MAR separated from the pool volume PLVOL. However, the present invention is not limited to the above case, and a data migration criterion common to all the storage areas MAR may be set collectively.

The above-described embodiment relates to the case where the disk adapters 17 have all of the functions of: a storage area allocation unit that provides a virtual primary volume PVOL to a host apparatus 2, and dynamically allocates a storage area MAR with the necessary capacity to the primary volume PVOL in response to a write access request from the host apparatus 2; a data storing unit that stores write data provided from the host apparatus 2 in the storage area MAR; an access attribute setting unit that sets an access possible/impossible attribute for the storage area MAR; a data migration unit that migrates write data stored in a plurality of the storage areas MAR for which the same access attribute is set to the same normalization destination logical volume VOL; and a criterion setting unit that sets a data migration criterion for migrating write data stored in the storage areas MAR to the normalization destination logical volume VOL. However, the present invention is not limited to the above case; circuit blocks with these functions may be provided separately from the disk adapters 17.

The present invention can be applied to various types of storage apparatuses.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage apparatus comprising:

a plurality of disk devices configuring at least one logical volume for storing data used by a host apparatus, a controller to provide at least one virtual volume to the host apparatus, and to dynamically allocate a storage area with a necessary capacity from among one or more storage areas of the virtual volume in response to a write access request from the host apparatus; and a memory storing information of access attributes set for storage areas, respectively, wherein a storage area size of the storage area included in the storage areas, is smaller than a size of the logical volume or the virtual volume, wherein the controller sets an access attribute and a normalization threshold for each storage area in response to the write access request, wherein the controller executes normalization for at least two storage areas having a first access attribute, in which the controller collectively migrates data stored in the storage areas to a normalization volume, based on a data migration criterion related to the normalization threshold of each storage area, and wherein the controller sets the first access attribute to the normalization volume after the normalization, wherein the access attribute is set by a system administrator for every write access request from the host apparatus.

2. A data protection method comprising:

configuring at least one logical volume for storing data used by a host apparatus, within a plurality of disk device, controlling to provide at least one virtual volume to the host apparatus, and to dynamically allocate a storage area with a necessary capacity from among one or more storage areas of the virtual volume in response to a write access request from the host apparatus; and storing in a memory, information of access attributes set for storage areas, respectively, wherein a storage area size of a storage area included in the storage areas, is smaller than a size of the logical volume or the virtual volume, wherein the controlling sets an access attribute and a normalization threshold for each storage area in response to the write access request, wherein the controlling executes normalization for at least two storage areas having a first access attribute, in which the controlling collectively migrates data stored in the storage areas to a normalization volume, based on a data migration criterion related to the normalization threshold of each storage area, and wherein the controlling sets the first access attribute to the normalization volume after the normalization, wherein the access attribute is set by a system administrator for every write access request from the host apparatus.

* * * * *